Patented Oct. 3, 1933

1,928,771

UNITED STATES PATENT OFFICE 1,928,771

LOW-DENSITY PARIS GREEN AND PROCESS OF MAKING THE SAME

Byron Payne Webster, Plainfield, N. J., assignor to Chipman Chemical Company, Inc., Boundbrook, N. J., a corporation of New York No Drawing. Application August 30, 1930
Serial No. 479,107

5 Claims. (Cl. 23—53)

The present invention relates to Paris green and more particularly to Paris green of relatively low density and to a process of making the same.

It is an object of the present invention to provide Paris green having relatively low density and constituted of relatively finely divided particles.

It is another object of the invention to provide Paris green containing a relatively large amount of combined arsenic to produce effective and quick killing insect properties therein.

It is a further object of the invention to provide Paris green containing a relatively low amount of water-soluble arsenic so that there is relatively little danger of burning the foilage of plants, etc., which are treated therewith.

It is also within the contemplation of the invention to provide a satisfactory process of making the aforesaid Paris green which is capable of being carried out practically on a factory scale.

Other objects and advantages of the invention will become apparent from the following description.

I have discovered that Paris green having a substantially lower density than ordinary Paris green can be made by a special sequence of operations constituting my improved procedure of making Paris green.

According to my discovery, a solution of copper sulfate is preferably first made by adding about 6 parts of copper sulfate to about 8.4 parts of water. To the solution of copper sulfate, a solution of sodium arsenite is added at a controlled rate. The sodium arsenite solution is preferably made by reacting about 4.3 parts of 99% white arsenic (arsenious oxide) with about 2.875 parts of soda ash in about 5.825 parts of water at a temperature of about 212° F. A solution of this sort has a specific gravity of about 15.5. In practice the sodium arsenite solution is added to the copper sulfate solution very rapidly and preferably at a rate of about 10 to 20 gallons per minute. During the addition of the sodium arsenite solution, it is preferred not to agitate the batch. After the addition has been made, moderate, intermittent agitation with a wooden paddle is preferably applied to the batch until the relatively violent reaction ceases. Thereupon acetic acid, usually 80% commercial acetic acid, is added to the batch to the extent of about one (1) part with moderate, intermittent agitation.

During the aforesaid procedure, it is important that the proper thermal conditions be maintained in the batch of reacting material. I have found that at the start of operations the temperature may be about 140° F. and that at the end of operations the temperature may be about 160° F. By employing temperatures lower or higher than the aforesaid temperatures, the color of the product is affected. At the lower temperatures the reaction is considerably retarded.

After the reaction is completed, the precipitate of Paris green is filtered or separated from the solution in any suitable manner. The separated Paris green is dried in an appropriate way and is then bolted.

The Paris green produced in accordance with the foregoing procedure has superior properties to ordinary Paris green. For instance, about 50 to about 65 cubic inches of my improved Paris green weighs only a pound whereas about 25 to 35 cubic inches of ordinary Paris green weighs a pound. Then again the particles of my improved Paris green are generally finer than those of ordinary Paris green. These improved properties make my improved Paris green especially useful as an insecticide where these features are of vital importance as one skilled in the art will readily appreciate.

The following schedule will demonstrate the superiority of my improved Paris green over ordinary Paris green.

|  | Ordinary | Improved |
|---|---|---|
| Density | 25–30 cu. in./# | 50–65 cu. in./# |
| Combined arsenic | 55% | 56.25–57.00% |
| Water soluble arsenic | 2.5% | 1.54–1.34% |
| Fineness: |  |  |
| 100 mesh | 96.5% | 98.0% |
| 150 mesh | 95.1% | 96.6% |
| 200 mesh | 94.3% | 95.2% |
| 325 mesh | 80.5% | 91.4% |

Due to the fact that my improved Paris green has a relatively low specific gravity and has very finely divided particles, it can be dispersed and suspended very uniformly either as a dust or as a wet spray. When so used, my improved Paris green is very effective for killing potato bugs, tobacco horn worms, cotton leaf worms and many other insects as well as for poison baits for killing out worms and grasshoppers.

Although, I have herein set forth specific temperatures, concentrations, periods of time, specific substances and specific operations, it will be observed that the use of equivalents and variations may be resorted to without departing from the spirit of the invention as defined in the appended claims.

I claim:—

1. A light-weight Paris green having a relatively low density, about 50 to about 65 cubic inches thereof weighing about one pound.

2. A light-weight Paris green of the character set forth in claim 1 which is constituted of finely-divided particles having the following fineness.

| Size | Approximately |
|------|---------------|
| 100 mesh | 98.0% |
| 150 mesh | 96.6% |
| 200 mesh | 95.2% |
| 325 mesh | 91.4% |

3. A light-weight Paris green of the character set forth in claim 1 which contains about 1.34% to about 1.54% of water soluble arsenic.

4. The process of producing a light weight Paris green which comprises forming a solution of about 6 parts by weight of copper sulfate and about 8.4 parts by weight of water, adding thereto a sodium arsenite solution formed by reacting about 4.3 parts by weight of 99% white arsenic, about 2.875 parts by weight of soda ash and 5.825 parts by weight of water at a temperature of about 212° F., adding said sodium arsenite solution to said copper sulfate solution at a rate of about 10 to 20 gallons per minute, subjecting said solutions to controlled moderate intermittent agitation after the addition of sodium arsenite solution has been completed, discontinuing said agitation when the relatively violent reaction ceases, adding about one part by weight of 80% commercial acetic acid to said solutions, subjecting the solutions to moderate, intermittent agitation, maintaining a regulated temperature of about 140° F. at the beginning of the operations and a regulated temperature of about 160° F. at the end, and removing the precipitate whereby a light weight Paris green is obtained.

5. The process of producing a light weight Paris green which comprises forming a solution containing about 6 parts by weight of copper sulfate, adding to said copper sulfate solution a sodium arsenite solution containing about 4.3 parts by weight of arsenious oxide very rapidly, subjecting said solutions to controlled moderate intermittent agitation, adding about one part by weight of acetic acid thereto, maintaining a regulated temperature of about 140° F. in said solutions at the beginning of the operations and a regulated temperature of about 160° F. at the end of the operations, and separting precipitated light weight Paris green from the solution.

BYRON PAYNE WEBSTER.